US005468042A

United States Patent [19]

Heinrichs et al.

[11] Patent Number: 5,468,042

[45] Date of Patent: Nov. 21, 1995

[54] COMPARTMENT CONFINING CONSTRUCTION WITH AN OPENING, A CLOSURE UNIT FOR THE OPENING AND A POSITIONING UNIT FOR THE CLOSURE UNIT

[75] Inventors: Heinrich-Josef Heinrichs; Stephan Enders, Koblenz; Klaus Koch, Dahlheim, all of Germany

[73] Assignee: Stabilus GmbH, Koblenz, Germany

[21] Appl. No.: 95,149

[22] Filed: Jul. 20, 1993

[30] Foreign Application Priority Data

Jul. 22, 1992 [DE] Germany .......................... 42 24 132.4

[51] Int. Cl.[6] ........................................................ B60J 5/04

[52] U.S. Cl. ............................ 296/146.4; 16/51; 49/137; 49/340; 296/146.8

[58] Field of Search .............................. 296/146.4, 146.8, 296/76, 106; 49/324, 340, 339, 137; 200/61, 62; 16/DIG. 7, 51, 66

[56] References Cited

U.S. PATENT DOCUMENTS

| | | | |
|---|---|---|---|
| 4,660,250 | 4/1987 | Tillman et al. | 16/51 X |
| 4,674,230 | 6/1987 | Takeo et al. | 49/32 |

FOREIGN PATENT DOCUMENTS

| | | |
|---|---|---|
| 0474918 | 3/1992 | European Pat. Off. . |
| 1459182 | 1/1969 | Germany . |
| 3519203 | 7/1986 | Germany . |
| 4038241 | 6/1991 | Germany . |
| 4007162 | 9/1991 | Germany . |

*Primary Examiner*—David M. Mitchell
*Assistant Examiner*—Kia M. Robinson
*Attorney, Agent, or Firm*—Brumbaugh, Graves, Donohue & Raymond

[57] ABSTRACT

A compartment confining construction comprises an opening and a closure unit movably mounted on the compartment confining construction for movement between a closing position and a fully opened position with respect to the opening. A fluid-based positioning unit is connected to both the compartment confining construction and the closure unit, the fluid-based positioning unit having two working chambers interconnected by at least one flow path, a movement of the closure unit corresponding to a flow of fluid from one chamber to another through the at least one flow path. A fluid flow control device is provided for controlling the flow of fluid through the at least one flow path and thereby controlling the movement of the closure unit. The fluid flow control device is actuatable by an electric actuating device. The flow of liquid occurs in response to movement of the closure unit when the closure unit is moved by an external force.

28 Claims, 10 Drawing Sheets

COMPARTMENT CONFINING CONSTRUCTION WITH AN OPENING, A CLOSURE UNIT FOR THE OPENING AND A POSITIONING UNIT FOR THE CLOSURE UNIT

BACKGROUND OF THE INVENTION

This invention relates to a compartment confining construction such as a cabin of a motor vehicle with an opening and more particularly a passenger entrance opening or a rearward opening of a station wagon. Such an opening is to be closed by a closure unit such as a side door or a backward door or a boot lid. It is frequently desired to provide a positioning unit for the respective closure unit. Such positioning unit may be used for positioning the closure unit in a selected angular position such as a closing position or a fully opened position or a intermediate position there between. Sometimes it is also desirable to use the positioning unit for actively moving the closure unit into selected angular positions. In case of side doors of motor vehicles the positioning unit may be helpful for compensating for gravitational torques which may act onto the side door as a result of a deviation of the hinge axis with respect to a vertical line. In the case of rearward doors or boot lids which are pivotally mounted about a substantially horizontal axis the positioning device may also be helpful for compensating for the gravity torque exerted by gravity onto the respective door or boot lid when moving these rearward doors or boot lids from a closing position into a opened position.

STATEMENT OF THE PRIOR ART

From German Patent 14 59 182 it is known to provide cylinder piston devices instead of mechanical arresting means for positioning a door, such that the door can be positioned in any selected angular positioning with respect to the plane of the door corresponding to the frame of the door. In this known cylinder piston device there is provided a spring biased locking valve in the piston and this locking valve controls the volume exchange of a liquid between two working chambers. The basic setting of the locking valve is a setting in which the locking valve is closed. For opening the locking valve it is necessary in an initial phase to exert a relatively high force onto the cylinder piston device. Thereafter, a smaller force exerted onto the door is sufficient for overcoming a damping action of the locking valve. Only when decreasing the movement velocity of the door below a predetermined value the locking valve is closed again and the door remains in the selected angular position.

From German Patent 35 19 203 there is known a positioning device for a motor vehicle door. This positioning device is again a cylinder piston device having a locking valve. The locking valve is operatively connected with a door handle. The user of the door is therefore obliged to act onto the door handle when opening the door in order to release the locking action. Moreover, high forces are necessary for moving the door against the action of the spring biased locking valve provided in the piston of the cylinder piston device. This involves further disadvantages and this particularly in case of cars to be used by handicapped people or in case of walking apparatus for handicapped people. Further disadvantages occur when removing loads from a motor vehicle in which case both hands of the operator may be necessary for carrying the respective loads on the one hand and when the door is to be closed on the other hand. All these situations are difficult with the known systems.

OBJECT OF THE INVENTION

It is an object of the invention to provide a positioning system for a door or flap which can be easily and reliably positioned in desired opening positions. It is a further object to facilitate opening and closing the door or flap.

It is a further object to provide a great handling comfort for the user of the door or flap.

It is a further object of the present invention to allow positioning of the door or flap into a desired position with a minimum of manual force.

SUMMARY OF THE INVENTION

A compartment confining construction comprises an opening and a closure unit. The closure unit has two main side faces, for example, an inner main side face and an outer main side face, when regarding the door of a motor vehicle cabin. The closure unit is movably mounted on the compartment confining construction for movement between a closing position and a fully opened position with respect to the opening. When the closure unit is moved between the closing position and the fully opened position a plurality, possibly an infinite plurality of positions are reached between the two terminal positions. A fluid based positioning unit is connected to both the compartment confining construction and the closure unit. By a fluid based positioning unit one has to understand, for example, a cylinder piston device. Besides a cylinder piston device there may be used as a positioning unit, for example, a bellows device such as a air spring inflatable by pressurized air. The fluid based positioning unit is provided with at least one flow path. When the closure member is moved with respect to the opening, a flow of fluid through this flow path occurs. It is to be noted here that the movement of the closure unit may be the result of the fluid flow. It is, however, also possible that the fluid flow occurs in response to a movement of the closure unit. Fluid flow control means are provided for controlling the fluid flow through at least one flow path and thereby controlling the movement of the closure unit. The fluid flow control means may be actuatable by an operator acting onto at least one surface district of the closure member.

A very important feature is now that this surface district has a surface area corresponding to at least a substantial part of the total surface of a respective side face. Assuming, for example, the situation that a driver in a passenger car wants to open the door beside him, he has only to act onto a relative large surface district or onto one of a plurality of relative large surface districts. For example, one surface district may be near the elbow of the driver, whereas a further surface district is near the hand of the driver gripping the steering wheel. A further surface district may be near to the shoulder of the driver. So, the driver can easily actuate the control means by moving his elbow, his hand or his shoulder against the respective surface district. The great advantage of such a possibility is that the driver is not obliged to search for a handle or a knob or the like for preparing the opening of the door. He must only move his hand or his elbow or his shoulder in a direction toward the adjacent side face of the door and has, due to the relatively large area of the respective districts, the chance to always touch a zone which can actuate the control means when being touched by the driver.

With the words "operator acts onto a surface district" we mean each kind of approach of the driver or passenger toward the adjacent side face of the closure unit or door. This approach may result in a mechanical impetus onto the closure unit or door as described later. It encompasses, however, also the possibility of activating a multi-layer foil or film material which acts as an electric circuit component of variable electric behavior in response to mechanical pressure exerted thereon. Further, the possibility is encompassed that an approach of the driver or passenger toward the respective district results in a capacity or inductivity variation of a large area electric component.

It is further to be noted that surface district does not necessarily mean a district which is strictly parallel to the main plane of the respective closure unit. One has to consider rather also the possibility of, for example, an elbow support provided on the inner side of a passenger car door adjacent the seat of the driver. The actuation of the control means may also be obtained by the driver approaching his lower arm section toward such an elbow support element or to grip with his fingers behind such an elbow support element.

According to a further aspect of the present invention, the flow control means may be actuatable by an operator exerting a mechanical impetus onto the closure unit. There are a plurality of possibilities how such a mechanical impetus to the closure unit or door may be sensed and transformed into a signal influencing the flow path and thereby controlling the flow of fluid through the flow path. This term "mechanical impetus" onto the closure unit shall mean that the impetus is directly made onto the body of the closure unit and not necessarily against an actuating member movably mounted onto the closure unit such as a knob or a handle. Direct impetus onto the body of the closure unit does, however, not exclude that the impetus is made against an upholstered inner side face of the closure unit or door. It is to be noted that this actuation by mechanical impetus may be combined with the idea of making a larger district of the door sensible to the operator's action. The closure unit or door may be constructed such that a sensitivity for impetus exists on the total inner or outer side face of the door. It is further to be noted, however, that the sensitivity against such an impetus may be restricted also to a very small surface portion of the respective side face of the closure unit.

According to a further aspect of the present invention the fluid flow control means are actuatable by electric actuating means. This facilitates the transmission of control signals to the control means of the fluid flow irrespective of the location of the positioning unit on the one hand and an actuating location of the closure unit on the other hand. In case of such electric actuating means the location of the actuating means is not restricted to a place on the door. It may also be provided at some other place such as usual window adjustment knobs.

The term "fluid based positioning unit" is to encompass both liquid based and gas based positioning units. In many cases a liquid based positioning unit will be preferred, because it is smaller and can be more easily mounted within a frequently very restricted space available for the positioning unit.

A preferred type of a fluid based positioning unit is a two-chamber positioning unit, having two working chambers with respective variable volumes. The fluid positioning control of such a device is considerably facilitated, when the sum of these variable volumes is substantially constant during a positioning movement of the positioning unit, because in such case there is no need for volume compensating means. Such a type of cylinder piston unit is, for example, known from German Utility model 85 00 855, corresponding to British patent 2 169 685. Such a cylinder piston unit may comprise a cylinder having an axis and defining a cavity therein along said axis. The cavity is confined by two end walls. A piston rod member extends through one of said end walls. A piston unit is connected to the piston rod member inside the cavity. The piston unit separates the cavity into two working chambers. A piston rod extension is connected with the piston unit in substantially axial alignment with the piston rod member. The piston rod extension extends through the other one of the end walls. The piston rod extension has substantially the same cross-sectional area as the piston rod member. Both working chambers are connected to at least one flow path.

According to a first alternative of the present invention the fluid based positioning unit may be a passive positioning unit. This means that the flow of liquid occurs in response to movement of the closure unit, when the closure unit is moved by an external force. This corresponds to the usual construction of motor vehicle doors, in which the motor vehicle door is moved between its opening position and its fully closed position, substantially by the hand of the passenger or driver. In this situation the positioning device is primarily used for positioning the respective door in a predetermined position, e.g. in the fully opened position or in one of the intermediate positions or even in the closed position. Moreover, the positioning unit may be used for damping the movement of the respective door or, generally spoken, of the respective closure unit.

According to a further alternative the fluid based positioning unit may-be an active positioning unit, effecting a movement of the closure unit in response to a forced flow of fluid through the at least one flow path. This means that some kind of servo-action is available for the user. This servo-action may be used for passenger car side doors in passenger cars of very high comfort, where one wants to avoid human effort for opening and closing the door. This may be desirable, for example, if the hinge axis of the door is inclined with respect to a vertical line such that a gravity torque biases the door in one direction of movement. The movement may then be effected in one or in both directions, so that a desirable velocity of the door may be obtained in both directions and the gravity torque is compensated for in one direction.

Further, such operation of the positioning unit may be used in rear doors of station wagons and in connection with boot lids of passenger cars, where usually a considerable gravity torque is to be overcome when opening.

In both alternatives of a passive positioning unit and of an active positioning unit at least one flow path may be provided with a valve unit which is preferably an electrically or an electromagnetically actuatable valve unit.

The valve unit may be an on/off valve unit which only allows a fully open or a fully closed passage through the valve unit or may be a continuously adjustable valve unit which may be adjusted to different damping values.

As an alternative to such an electrically or electromagnetically actuated valve unit at least one flow path may have a flow path section which is subject to an electric or to an electromagnetic field. Then the fluid to be used within the fluid based positioning unit should be a liquid having a viscosity variable in response to said electric or electromagnetic field. Such the damping force of the fluid based positioning unit may be continuously variable. It is possible to vary this viscosity to such an extent that in case of a first field strength the flow path section behaves like a closed valve unit and with a second field strength the flow path section provides no or substantially reduced damping effect.

For providing an electric field within the flow path section this flow path section may be combined with an arrangement of capacitor plates which capacitor plates are connected to a voltage source through an electric switch or may be connected to a voltage source of a variable voltage.

Positioning units having only one working chamber are not excluded within the frame of the invention. Nevertheless, positioning units comprising two working chambers interconnected by the at least one flow path are preferred. In such a construction the at least one flow path may be provided with the flow control means. With such a device fluid transportation occurs between the two working chambers in response to a movement of the closure unit by manual force exerted thereon. The flow control means may be adapted to a variable damping requirement and may be closed for positioning the door in a desired terminal or intermediate position.

The flow path interconnecting the two working chambers may be provided inside a piston unit which separates two working chambers from each other. A further version of a two chamber positioning unit provides a piston unit within a cylinder such that the piston unit separates two working chambers within the cylinder from each other. The two working chambers are connected by a flow path extending across the piston unit outside the cavity of the cylinder member and more particularly within an annular channel surrounding the cylinder member in which the piston unit is movably received.

When an active fluid based positioning unit is required this positioning unit may be driven by a fluid flow inducing unit such as a pump. This fluid flow inducing unit may have fluid inlet means and fluid outlet means and at least one of the fluid inlet means and the fluid outlet means may be connected to at least one fluid flow path and through the at least one fluid flow path to a working chamber of the positioning unit.

Preferably, the fluid flow inducing unit is a rotary pump driven by rotary driving means, preferably by an electric motor. In case of driving the fluid flow inducing unit by a rotary pump the volume per time unit of the fluid flow may be controlled by the motor driving the rotary pump. Such, the velocity of movement of the closure unit may be adjusted to the respective requirements by varying the r.p.m. of the motor, for example, by electronic motor control. Alternatively a continuously or a discontinuously acting clutch unit may be provided between the motor and the rotary pump, which clutch may be again controlled by electric circuit means.

Alternatively one can provide as fluid based positioning unit a fluid operated slave unit connected by the at least one flow path to a master unit. For example, the fluid operated slave unit may be a two-chamber slave unit connected to a two-chamber master unit by respective flow paths. In such case the two-chamber master unit may be a linear cylinder piston unit with two working chambers in which the piston is driven along the cylinder by driving means. The two working chambers of the master unit may be connected with two respective working chambers of the slave unit which may be again separated by a piston unit, which piston unit is connected with a piston rod member such that one of the cylinder member and the piston rod member may be connected to the compartment confining construction whereas the other one may be connected to the closure unit.

With both, passive and active, positioning units the risk of a break down of the fluid flow control means must be faced. When, for example, a break down occurs in a door locking condition of the fluid flow control means, there may be a need to nevertheless move the respective door or closure unit to a further position, for example, when the driver wants to close the door in order to start the vehicle or wants to open the door in order to get out of the vehicle. Therefore, a fluid based positioning unit may be provided with an emergency flow path. The emergency flow path may be provided by a safety valve or a pressure controlled valve which opens at a predetermined pressure within the respective working chamber. In case of a two-chamber positioning device with a flow path between the two working chambers a safety valve may be provided in the flow path which opens in both directions at a predetermined pressure within one or the other of the two working chambers.

In case of an active positioning unit with a fluid conveying pump between two working chambers the pump may fulfill the function of an electric control valve which is closed when the motor is at a stand still and as a result thereof also the pump is at a standstill. This is a question of the internal flow resistance of the respective pump. For an emergency operation in case of a failure of the pump a security valve may be arranged in a bypass with respect to the pump such as to open in response to movement of the closure unit by hand.

When the closure unit is a side door of a motor vehicle adjacent a driver's or passenger's seat the surface district onto which the operator can act for actuating the fluid flow control means may be located such within the respective side face of the door or closure unit as to allow the driver or passenger respectively an actuation when being seated on his respective seat in an usual sitting position with a minimum of district search activity and a minimum of body movement.

It has been mentioned above that the fluid flow control means may be actuated by a mechanical impetus onto the closure unit. This is easily understandable when the door is unlocked or slightly open. In this case the driver or passenger can accelerate the door by such impetus such that impetus sensor means can be used for sensing the movement of the door. For example, the impetus sensor means may be sensitive to the acceleration of the door or, generally spoken, of the closure unit. The principle of impetus sensing is, however, also applicable when the closure unit or door is still closed due to the inherent elasticity of even highly rigid door body constructions. In such case one may use an acceleration sensor or a shock sensor which provides a signal in case of an impetus or shock to the door body, which signal may then be supplied to the fluid flow control unit.

The sensitivity of the impetus sensor means may be dependent on the direction of the impetus. In case of a pivotable door, for example, the sensing direction may be substantially orthogonal to the main side faces of the door. In case of a sliding door one can provide on this sliding door a surface district for being acted upon by the driver or passenger which is substantially orthogonal to the direction of sliding movement. In such case the sensing direction of the impetus sensor may be parallel to the sliding direction of the sliding door.

A most reliable and simple construction of impetus sensor means can be obtained by measuring the pressure occurring as a result of an impetus in the fluid based positioning unit. In such construction the impetus sensor means can be easily available pressure measuring devices.

The fluid flow control means may be connected to actuating means which actuating means are further connected to data processing means. This is of particular interest when the compartment confining construction is part of a motor vehicle. In such case the data processing means may be further connected to additional vehicle operation parameter sensing means. The additional vehicle operation parameter sensing means may be, for example, vehicle speed sensor means. When a signal representative of the vehicle speed is available one can, for example, prevent through the flow control means that a door of a vehicle is opened when the vehicle moves or moves with a speed beyond a predetermined speed.

The data processing means may further be connected to memory means. Such memory means may be subdivided in a memory unit for containing variable data to be fed in by the respective manufacturer and a user's memory group allowing the user to feed in user's specific data.

For explaining this, an example may help: A motor car manufacturer wants to limit the opening angle of a backward door of a station wagon to a first angle value which allows entering and removing loads. He enters a corresponding angle value. If the station wagon is sold to a small person, this small person has difficulties to reach the upper end of the rearward door when fully opened in accordance with the angle selected by the motor car manufacturer. The small person can now enter by, for example, a key board a second angle value which makes it easy for this person to reach the upper end of the backward door in the open position when she or he wants to close the backward door.

The various features of novelty which characterize the invention are pointed out with particularity in the claims annexed hereto and forming a part of the disclosure. For a better understanding of the invention, its operating advantages and specific objects attained by its use, reference sould be had to the accompanying drawings and descriptions in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
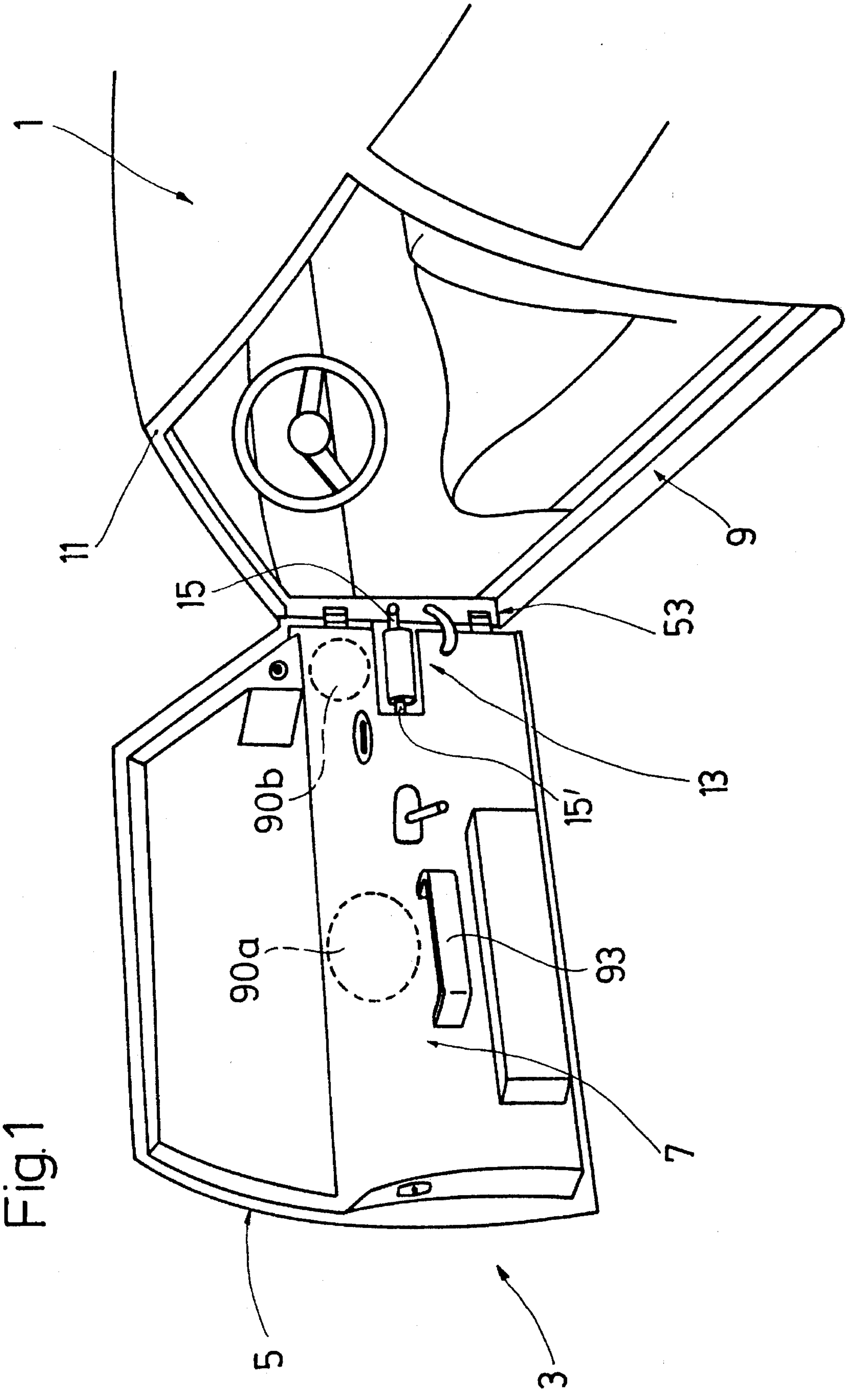
FIG. 1 shows a partial view of a passenger car with a driver's side door.

FIG. 1 shows a part of a passenger car cabin 1 with a side door 3 being opened. The side door 3 is connected to the cabin 1 by hinges. The side door is of conventional design and comprises a door body with a frame unit 5, a window and the usual equipment and outfit such as operating handles for the door and for the window. Moreover, on the inside of the door body there is provided an inside door covering which may be upholstered. The cabin 1 comprises a sill 9 and a stationary frame 11. Locking means are provided between the door 3 and the cabin 1. Further, sealing means are provided between the door 3 and the cabin 1.

A cylinder piston unit 13 is provided between the door 3 and the cabin 1. This cylinder piston unit 13 is connected by articulated fasteners 15,15' to the cabin 1 and to the door 3, respectively. One of the fasteners 15,15' is provided on a piston rod and the other one is provided on the bottom end of the cylinder.

Figure 2:
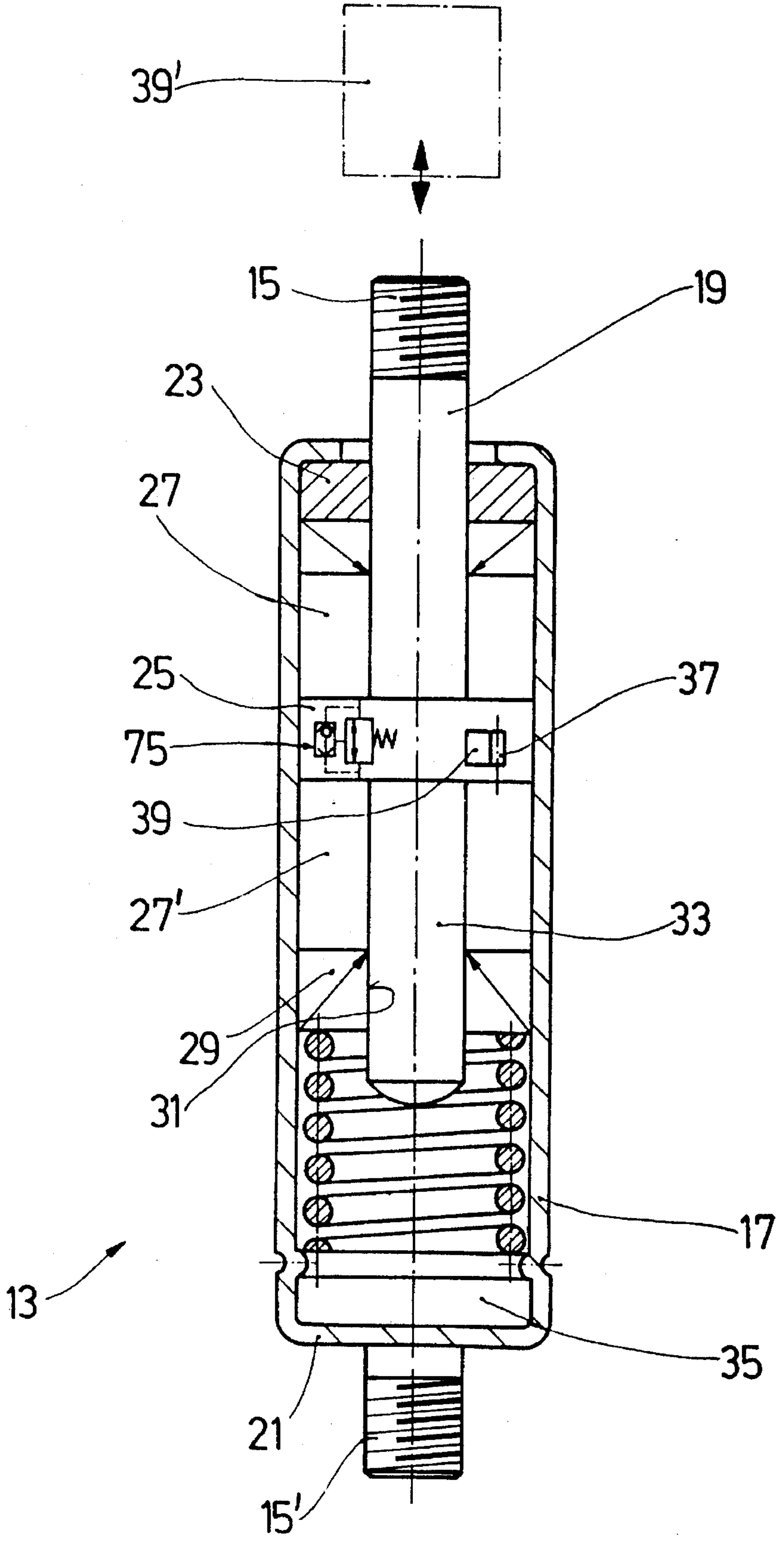
FIG. 2 shows a cylinder piston device with a valve unit inside a piston unit.

In FIG. 2 one recognizes the cylinder piston unit 13 in more detail. This cylinder piston unit comprises a cylinder or pressure tube 17 with a bottom wall 21. At the other end of the cylinder 17 there is provided a piston rod sealing and guiding unit 23. The cavity within the cylinder is separated into two working chambers 27,27' by a piston unit 25 which is fastened to the piston rod 19 inside the cavity. The bottom side working chamber 27' is confined at one end thereof by a floating wall 29 which is biased by a helical compression spring. The piston rod 19 and the piston unit 25 are supplemented by an extension 33 which extends through a bore 31 of the floating wall 29. The cross-sectional area of the extension 33 is substantially equal to the cross-sectional area of the piston rod 19. As a result of these equal cross-sectional areas the cylinder piston device behaves as a so-called constant volume device. With other words, the sum of the volumina of the two working chambers 27,27' is always constant irrespective of the position of the piston rod 19 and the piston unit 25 along the axis of the unit. When an exchange of fluid between the working chambers 27,27' is possible, as explained below, both working chambers 27,27' are always completely filled with fluid and, more particularly, with liquid like an hydraulic oil. No volume of liquid must be conveyed outside the cavity when the piston rod 19 moves in axial direction.

Inside the piston unit 25 there is provided a switchable valve unit 37 which can be controlled by a control unit 39 or 39'. The control unit 39 is preferably an electric control unit and can be an electromagnetic coil with an armature or an electric motor or an electrically controlled piezo component. This control unit 39 is used for switching or possibly continuously adjusting the valve unit 37. One can see in FIG. 2 the possibility of the control unit 39 being provided inside the piston unit 25 and one can further see the alternative of the control unit 39' being provided outside the cylinder 17, e.g. on the piston rod 19.

The floating wall 29 is loaded by a prestressed helical compression spring such that on the one hand leakage of liquid out of both working chambers 27,27' can be compensated for. Also volume variation of the volumes in the working chambers 27,27' as a result of temperature variations can be compensated for by the movement of the floating wall 29 under the action of the helical compression spring or under the action of pressurized gas within a chamber 35.

The decision, whether the fluid control unit 39 is located as indicated at 39 in FIG. 2 or at 39' in FIG. 2 depends on the space requirement within the cylinder piston unit 13 on the one hand and within the space provided for the cylinder piston unit 13 as indicated in FIG. 1 on the other hand. A security valve 75 is provided in the piston unit 25.

Figure 3:
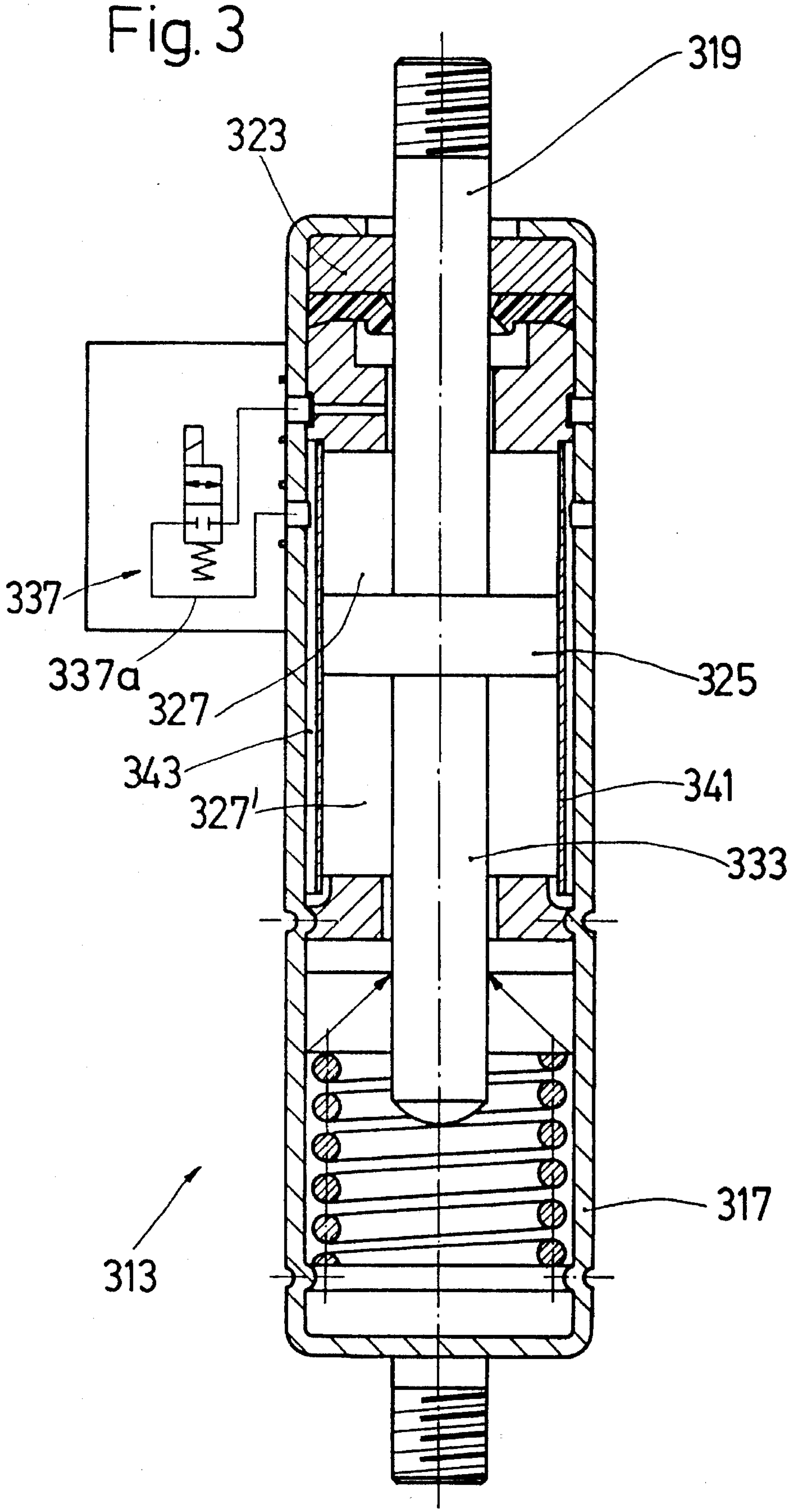
FIG. 3 shows a cylinder piston device with a valve unit allocated to a piston rod sealing and guiding unit.

In FIG. 3 a further embodiment of the cylinder piston unit as shown. Analoguous components of this cylinder piston unit are designated by the same reference numerals as in FIG. 2, however, increased by 300.

In the embodiment of FIG. 3 there is provided an annular flow path 343 which bypasses the piston unit 325 and connects the working chambers 327,327'. A valve unit 337 which is located outside or inside the piston rod guiding and sealing unit 323 is inserted in the flow path between the working chambers 327,327' in series with the annular duct 343. A flow path section **337*a* extends between the working chamber 327 and the annular duct 343. In this flow path section 337*a* there is provided the electromagnetically actuated valve unit 337. The annular duct 343 is confined between the cylinder member 317 and a bypass tube 341 which is provided inside the cylinder 317. When the valve unit 337 is closed there is no fluid flow connection between the two working chambers 327,327'. So, the piston unit 325 is locked and the piston rod member 319 is also locked with respect to the cylinder 317. So, when regarding again FIG. 1, the door 3 is locked with respect to the door frame 11**.

The embodiment of FIG. **4*a* is similar to the embodiment of FIG. 3 with the one exception that the valve unit 337 has been replaced by a fluid flow section 447. This fluid flow section 447 replaces the valve unit 337 of FIG. 3. The fluid flow section 447 is confined between an electrode layer 445 provided on the external surface of the piston unit 425 and an electrode layer 445' which is provided on the internal surface of the cylinder member 417. The electrode layers 445,445' are connected to a voltage source V+,V–, the positive pole V+, which is connected to the electrode layer 445, whereas the negative pole V– is connected to the electrode layer 445'. An electric field is such defined between the electrode layers 445 and 445'. This electric field extends radially across a gap defined between the electrode layers 445 and 445'. The electrode layers 445,445'** are insulated with respect to each other so that a short circuit between the electrode layers is prevented.

Again both working chambers 427 and 427' are completely filled with liquid, namely, a so-called electrorheological liquid, the viscosity of which can be varied by applying varying electric fields between the two electrode layers 445 and 445'. By selecting the electric field, which is responsive to the applied voltage V+,V–, the viscosity of electrorheological liquid within the gap 447 can be varied between wide limits so that this viscosity either prevents a flow of liquid through the gap 447 or allows a substantially unresisted flow through this gap. Any intermediate value of liquid flow resistance is possible by a respective value of the voltage V+,V–. Thus, it is possible either to provide a damping behavior of the piston unit 413 or to provide a non-damping behavior between them, or to provide a locking status of the piston rod 419 with respect to the cylinder 417.

It is of considerable advantage to have the gap 447 as shown in FIG. **4*a* on the circumferential face of the piston unit 425 such that a passage of relatively large cross-sectional area is provided between the two working chambers 427 and 427' at a small width of the gap. Such, a relatively strong electric field can be maintained between the two electrode layers 445 and 445'** at a given voltage V+,V–.

Figure 4A:
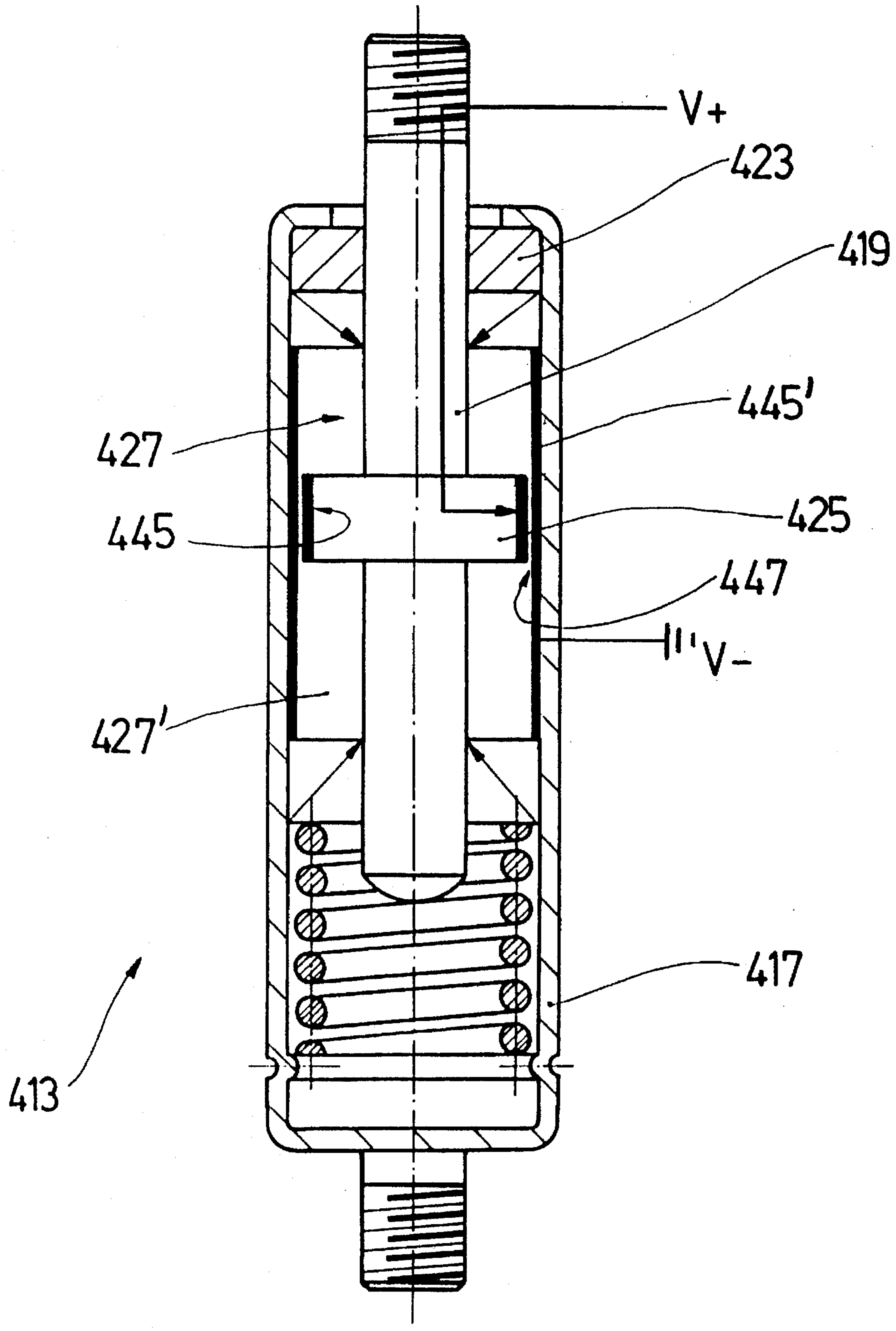
FIGS. 4*a*–4*d* show cylinder piston units in which the damping characteristics and/or the locking status can be obtained by an electrorheologic fluid.

In the embodiment of FIG. **4*b* analoguous components are designated with the same reference numerals as in FIG. 4*a*. In this embodiment the gap 447 is omitted and a passage 449 is provided between the working chambers 427 and 427'. The electrode layer 445 is provided on the piston rod 419 rather than on the outer circumferential face of the piston unit 425 as in FIG. 4*a*. In this embodiment a major part of the electrorheological liquid contained within the working chambers 427,427' is subjected to the electric field between the electrode layers 445 and 445'. While the radial distance between the electrode layers 445 and 445' is increased as compared with FIG. 4*a*, one must realize that the radially oppositely positioned electrode layers 445,445' are considerably increased, so that again a relatively small voltage requirement exists for maintaining a required viscosity. The damping and positioning behavior of the cylinder piston unit can further be influenced by the cross-sectional area of the bore 449 which interconnects the working chambers 427, 427'**.

Figure 4B:
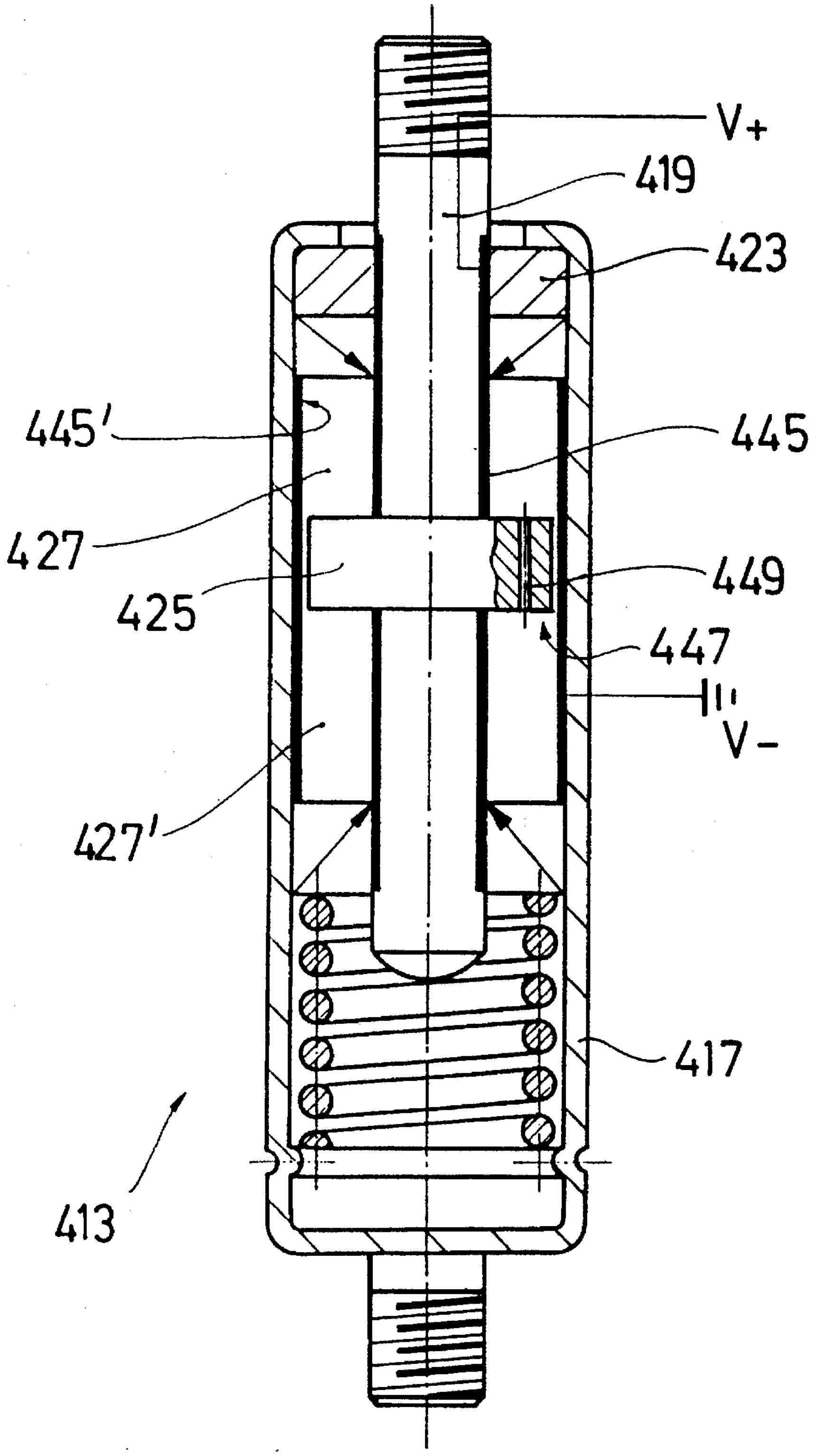
Figure 4C:
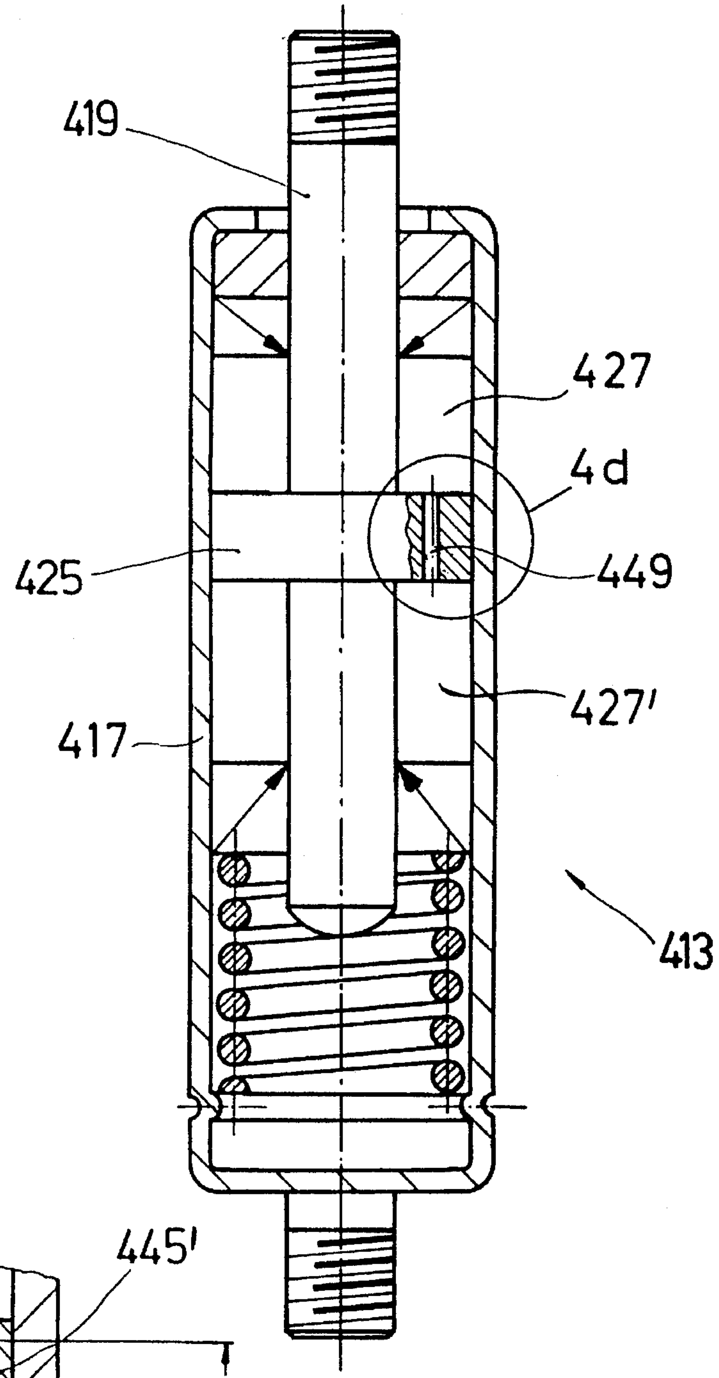
Figure 4D:
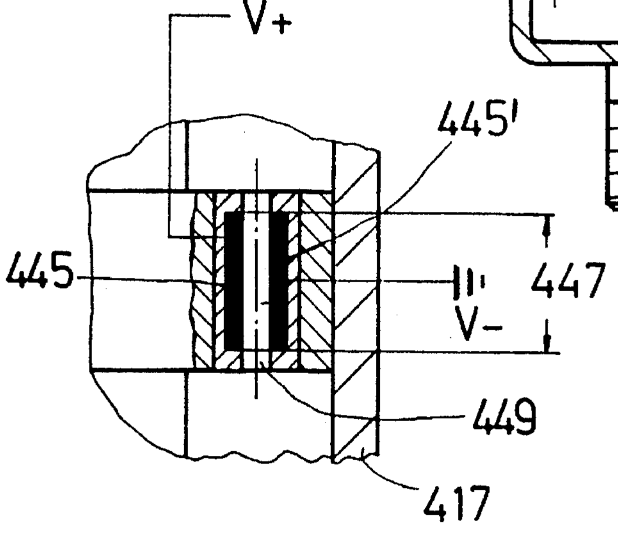

In the embodiment of FIGS. **4*c* and 4*d* there is again shown a passage 449 between the working chambers 427 and 427'. However, in this embodiment there is provided a modified passage 449 which is shown in more detail in FIG. 4*d*. FIG. 4*d* is a detail at 4*d* of FIG. 4*c* in a larger scale. One recognizes that the electrode layers 445,445' which were applied in FIG. 4*b* to the external surface of the piston rod 419 and to the internal surface of the cylinder 417 have now been replaced by electrically mutually insulated layers 445, 445' inside the bore 449. These electrode layers 445, 445' are again electrically connected to the voltage source V+,V–. So, an electric field is defined within the passage 449 and the viscosity of the liquid can be selected in the critical section of the passage 449. The damping resistance through the passage 449** can be either increased or decreased or made so high that a locking effect is obtained.

In the embodiment of FIG. 5 one recognizes again the positioning unit of FIG. 2 with analoguous components being designated by the same reference numerals as shown in FIG. 2 increased, however, by 500.

Figure 5:
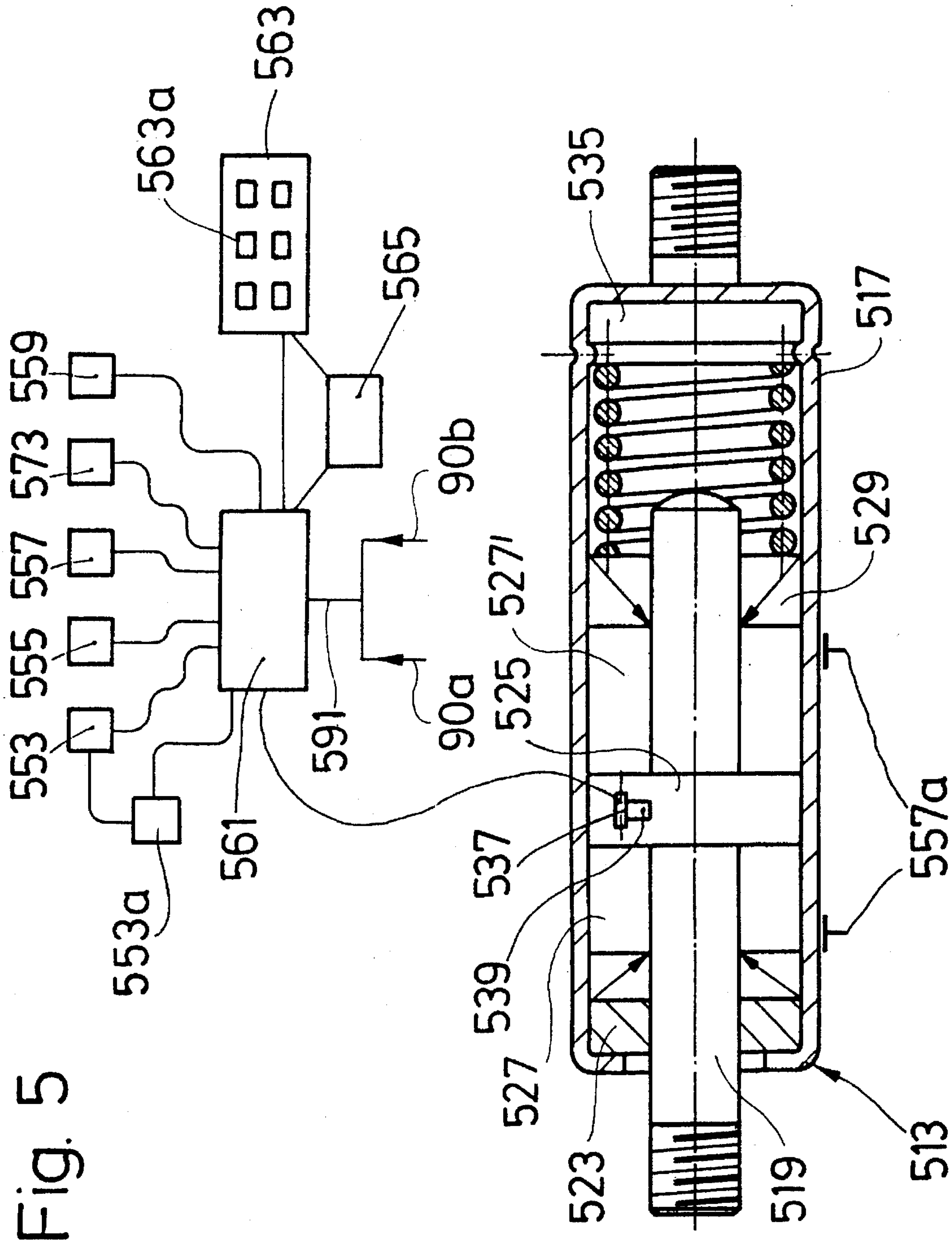
FIG. 5 shows a positioning unit in combination with a data processing unit, sensing units and a memory unit.

According to FIG. 5 the control unit 539 acting onto the valve unit 537 is in electric signal transmitting connection with a data processing unit 561. This data processing unit 561 is connected to a plurality of sensor units 553–559. 553 is a position sensor detecting the position of the positioning unit 13 of FIG. 2 or detecting the position of the door 3 as shown in FIG. 1. In FIG. 1 there is shown at 53 a positioning sensor which may detect the opening angle of the door 3 and thereby indirectly detect the corresponding length of the positioning unit 13 between the fastening elements 15,15'. The position detector 553 may also be dependent on the axial position of the piston unit 25 with respect to the cylinder 517. In this case the positioning detector 553 may be provided, for example, by a potentiometer path extending along the internal surface of the cylinder 517 and cooperating with a sliding contact provided on the piston unit 525. Alternatively, the position detector may also be provided by an infra-red distance measuring system established on the door 3 on the one hand and on the cabin structure 1 on the other hand, or by a distance measuring capacitor provided between the door 3 on the one hand and the cabin structure 1 on the other hand.

A further detector 555 is an acceleration detector which detects the actual acceleration of the door 3 with respect to the cabin structure 1 or, alternatively, the actual acceleration of the piston rod 519 with respect to the cylinder 517. This acceleration sensor 555 may e.g. be an acceleration sensor comprising a known mass cooperating with a support spring acting on said mass such that the deformation of the support spring can be measured as representing the actual value of acceleration. Alternatively, the acceleration sensor may be based on the principle of measuring, for example, the path of movement of the piston rod 519 with respect to the cylinder 517 during a predetermined time unit and calculating from the path of movement per time unit the acceleration by a differentiator unit.

At 557 there is shown a pressure sensor 557 is combined with pressure metering devices at 557*a*. The pressure sensor 557 may be used for sensing the pressure within the working chambers 527,527', respectively. A velocity sensor 559 is provided for sensing the actual speed of the vehicle along a road. This sensor 559 may be responsive to a tacho-generator or to an ABS-device.

A first memory 565 and a second memory 563 are connected to the data processing unit 561. The first memory 565 is provided for storing fixed data which are, for example, fed in by the vehicle manufacturer and correspond to fixed parameters of the vehicle. The memory group 563 is provided with a key board 563*a* which may be used by the driver of the vehicle for feeding in data corresponding to his personal requirements.

Referring now to FIG. 1 there are shown two districts 90*a*,90*b* at the inner side face of the door 3. These districts 90*a*,90*b* are sensitive to an actuating pressure acting thereon in response to an approach of the elbow or of the hand of the driver. By approaching these face districts 90*a*,90*b* electrical signals may be generated which are fed as shown in FIG. 5 into the data processing unit 561 at an input 591 which is connected to the face districts 90*a* or 90*b*. In the face districts 90*a*,90*b* there may be provided, for example, multi layer films or foils which act as electrical switches when being compressed in a direction orthogonal to the main plane of the door 3. It is assumed now as a matter of example, that the door 3 of FIG. 1 is locked by a conventional door locking mechanism. The door locking mechanism may be unlocked either by conventional mechanical action onto a handle or by acting onto an electric switch, which electric switch may, for example, be integrated within the face district 90*a* and/or 90*b* so that on mechanical action by the elbow onto the district 90*a* or onto the district 90*b* the locking mechanism may be unlocked. The valve unit 537 or, alternatively, an electrorheological flow path section is assumed also to be open in the closed status of the door. When the driver acts now by his elbow onto the face district 90*a* or by his hand onto the face district 90*b* an electrical switch unlocks the locking mechanism and simultaneously maintains the valve unit 537 open with a relatively large cross-sectional flow area. Then the door 3 can easily be moved in the opening direction. As long as the driver remains with his elbow or with his hand in contact with the face district 90*a*, or the face district 90*b* respectively, the valve unit 537 is maintained in an opened status such that there is no essential flow resistance to a flow of liquid between the two working chambers 527,527'. Thus, the door can be easily openend without substantially damping resistance resulting from the positioning unit 517 which is continuously lengthened in accordance with the opening angle of the door 3. As soon as the driver withdraws his elbow or his hand from contact with the face district 90*a* and the face district 90*b*, respectively, the electric signal supplied at 591 to the data processing unit 561 is changed and the data processing unit provides an electric signal to the valve unit 537 such that this valve unit 537 is switched to a high damping resistance or to a complete closure. Then the piston rod 519 connected with the piston unit 525 is stopped and therefore the door is maintained in a desired position. The movement of the door is in this case effected by the driver's mechanical action onto the door 3, because the positioning unit is a so-called passive positioning unit. The acceleration detector 555 provides a signal as to the acceleration of the door with respect to the compartment unit 1 or as to the acceleration of the piston rod 519 with respect to the cylinder 517. It may be desirable to prevent a too strong acceleration of the door 3. Therefore, an upper acceleration limit may be fed into the memory group 565 by the motor vehicle manufacturer. As soon as the acceleration detector or sensor 555 senses an acceleration value beyond the upper limit of acceleration as stored in the memory 565, the data processing unit 561 may provide a signal adapted for partially closing the valve unit 537 such that the flow resistance of the valve unit 537 is increased and the further acceleration of the door movement with respect to the compartment confining unit is reduced.

It is well possible that the position detector 553 issues through a differentiator 553*a* a velocity signal to the data processing unit 561 representing the velocity of movement of the piston rod 519 with respect to the cylinder 517. Again an upper limit for the movement velocity of the door and the piston rod 519 may be provided within the memory group 565. When the velocity limit stored in the memory group 565 is exceeded and a corresponding excess signal is provided by the differentiator 553*a*, an electric control signal may again be delivered to the valve unit 537 for reducing the flow cross-sectional area of the valve unit 537 for preventing further increase of the velocity of the door.

In the memory group 565 there may be further provided by the motor vehicle manufacturer data as to the maximum admissible opening angle of the door. When the position detector or sensor 553 measures an opening angle which exceeds the above mentioned maximum opening angle, a stop signal may be issued from the data processing unit to the valve unit 537 such that the valve unit 537 is completely closed and no further opening of the door is possible.

The driver of the car may possibly like to limit the opening of the door at an opening angle which is smaller than the maximum allowable opening angle provided by the car manufacturer. For example, the driver may use an automobile shelter which allows an entrance of the car only at a very limited opening angle of the door in order to avoid a collision of the door with the periphery of the entrance passage. In this situation the driver may feed into the memory group 563 using the keyboard 563*a* a personal limit of the opening angle for the door. Assuming now that the driver opens the shelter door by an opening signal to a shelter door opening mechanism one can provide a further input to the data processing unit which sends a signal to the data processing unit when the driver is approaching the automobile shelter and therefore activates a shelter door opening mechanism. Such, the limitation of the opening angle of the vehicle door is activated and the door can't be opened beyond this opening limit or alternatively a warning signal may be activated informing the driver that he may not enter into the automobile shelter, because the door of his car is opened beyond the permissible opening angle. Similar problems may also occur when a rearward door of a station wagon or a boot lid of a passenger car is opened beyond an admissible opening angle. Such problems may be solved in a similar way as described before for the case of a vehicle side door. There is sometimes a risk that a door is opened during driving operation of a vehicle. This can be prevented by the speed sensor 559. If the speed sensor indicates driving condition or driving condition beyond a certain speed, it delivers a signal to the data processing unit 561 which may be compared with a predetermined speed value fed into one of the memory groups 563 and 565. So, upon exceeding this predetermined speed the data processing unit 561 delivers a signal to the valve unit 537 so that this valve unit 537 is closed or—if it is already closed—can't be opened by the normal door operating activities of the driver even in the completely closed position of the door.

One can easily realize that excess velocity or an excess acceleration of the door, and of the piston rod 519 respectively, can also be sensed by the sensor 557 responding to the pressure in the working chambers 527,527'.

When the door has once been positioned in a desired position and one wants to further open the door the driver can again act onto one of the face districts **90*a*,90*b* for again opening the valve unit 537. Thereafter, the driver can by very small force acting onto the door 3 of FIG. 1 further open the door up to a possible limit prescribed by one of the memory groups 563 or 565**.

The closing of the door can be effected according to similar principles. In FIG. 1 one recognizes an elbow support which may be used for pulling the door toward closed position. This elbow support may be provided with a pressure sensitive actuator which again delivers a signal to the data processing unit when the driver acts onto the elbow support in door closing direction. Such, the valve unit 537 is opened to a predetermined cross-sectional area and the door can be easily and without substantial damping effect moved toward its closing position. Again the velocity and the acceleration of the door during the door closing operation may be limited by the acceleration sensor 555 or by a velocity sensor. Moreover, the damping characteristic of the valve unit 537 may be adjusted in the final phase of the door's approach to the door frame 11 such that on one hand the door reliably falls into the lock and on the other hand the shock resulting from the door falling into the lock is limited.

It is easily understandable that it is not necessary to have the valve unit 537 closed when the door is closed. This is only necessary if according to a further alternative of the present invention the positioning unit 517 is to replace a conventional locking mechanism. If such conventional locking mechanism is provided the valve unit 537 may be open in the closed position of the door. In this case it may be only locked as an additional safety when the motor vehicle moves such that the door can't be opened during driving of the motor vehicle, even when the driver acts upon a releasing lever of the locking mechanism. When the locking mechanism has been unlocked and the door has been opened to a small gap the valve unit 537 is closed unless the driver acts onto one of the surface districts **90*a*,90*b***.

It has been mentioned above that the positioning unit 513 may be actuated by a mechanical impetus acting upon the door 3. Such mechanical impetus can be sensed by the acceleration sensor 555 or by the pressure sensor 557. It is therefore possible to control the valve unit 537 also in response to shocks exerted onto to the face district **90*a* by the elbow of the driver or onto the face district 90*b* by the hand of the driver. By such shock the valve unit may be opened completely or to a desired damping resistance when it is desired to open or to close the door. For closing the door a shock may again be exerted onto the elbow support 93** in a door closing direction.

It is easily understandable that by using the keyboard **563*a* one can also feed a signal to the data processing unit 561** saying that one or several doors are not allowed to be opened at all. Such a so-called children-security system may be provided.

In FIG. 5 the reference number 573 represents a touching sensor such as an inductive or capacitive touching sensor which may be alternatively used for opening or closing the valve unit 537.

It is easily understandable that the different possibilities of operation which have been described with respect to the embodiment of FIG. 5 can be applied also when using a positioning unit as shown in one of FIGS. 3–**4*c*. As the valve unit 537** is controlled by an electronic sensor and data processing means there is no substantial delay.

A most essential aspect of the present invention is that a free movement of the door is possible between subsequent position with damping operation occurring only when needed for preventing strong shocks onto the compartment and door structure. This is a great advantage over known mechanical constructions in which discrete positions are defined by mechanical arresting means. The advantage of the present invention over known hydraulic positioning systems is that even for starting the movement of the door in one or both directions there is no need for a strong manual action onto the door. Even a mechanical impetus used for providing a starting shock to be sensed by a an acceleration detector may be very small. A further great advantage is that the driver easily finds the relatively large face district **90*a* and 90*b*** even if he is not well familiar with the specific car.

In case of controlling the valve unit 537 by a shock onto the door 3 this shock will be effective irrespective of the place where the shock acts onto the door 3.

For security reasons it is preferred to have the valve unit 537 always open when the door is closed and locked such that the positioning unit 513 does not prevent or retard a quick opening of the door in an emergency situation.

The data processing unit in combination with the sensor units 553,555,557,573,559 and in combination with the memory unit groups 563,565 give many possibilities in combining data such as obtaining maximum handling comfort and to reduce the hardware investment. This may be explained e.g. as follows:

One can intiate a closing of the door by an impetus exerted onto the elbow support 93 in closing direction. By such impetus the valve unit 537 may be opened such that the door can be closed by a continued low force pulling action acting onto the elbow support 93. On the other hand one may also exert an impetus onto the elbow support 93 for positioning the door i.e., bringing the door to a standstill after a preceeding opening movement of the door. In this case it will be necessary to initiate by the impetus onto the elbow support 93 a closing of the valve unit 537.

In both situations one can sense the impetus to the elbow support 93 either by the acceleration sensor 555 or by the pressure sensor **557*a*–557. In assuming that the impetus is the same in both situations the acceleration sensor 555 or the pressure sensor 557*a*–557 will provide identical signals. Therefore, the data processing unit 561 must recognize whether the signal provided by the acceleration sensor 555 or by the pressure sensor 557*a*–557 is intended to position the door after an opening movement or to release the positioning in preparation of a closing movement. The data processing system can recognize the different intentions by considering other parameters which have been observed before. So, the data processing unit can easily recognize that an impetus exerted onto the elbow support is intended for positioning the door after an opening movement if the direction of movement of the door has been observed and memorized before. On the other hand the data processing unit may easily recognize that an impetus exerted onto the elbow support is intended for preparation of door closing when the data processing unit is informed by the memory unit 565 or 563** that the door was positioned at standstill before the impetus was exerted onto the elbow support.

It is well understandable that this principle of combining initiation signals and signals about the preceeding story can be used in many other situations.

It is also understandable that this principle can be applied irrespective of how initiation signals such as door movement initiation signals or door stop initiation signals are generated, for example, they may be generated by impetus onto the face districts **90*a*,90*b* or the elbow support 593. Alternatively, they may be generated by pressure responsive composite layers being provided in the face districts 90*a*,90*b* or on the elbow support 93** such that these composite layers provide an electric switch effect or an electric resistance variation effect or an electric capacity variation effect.

Figure 6:
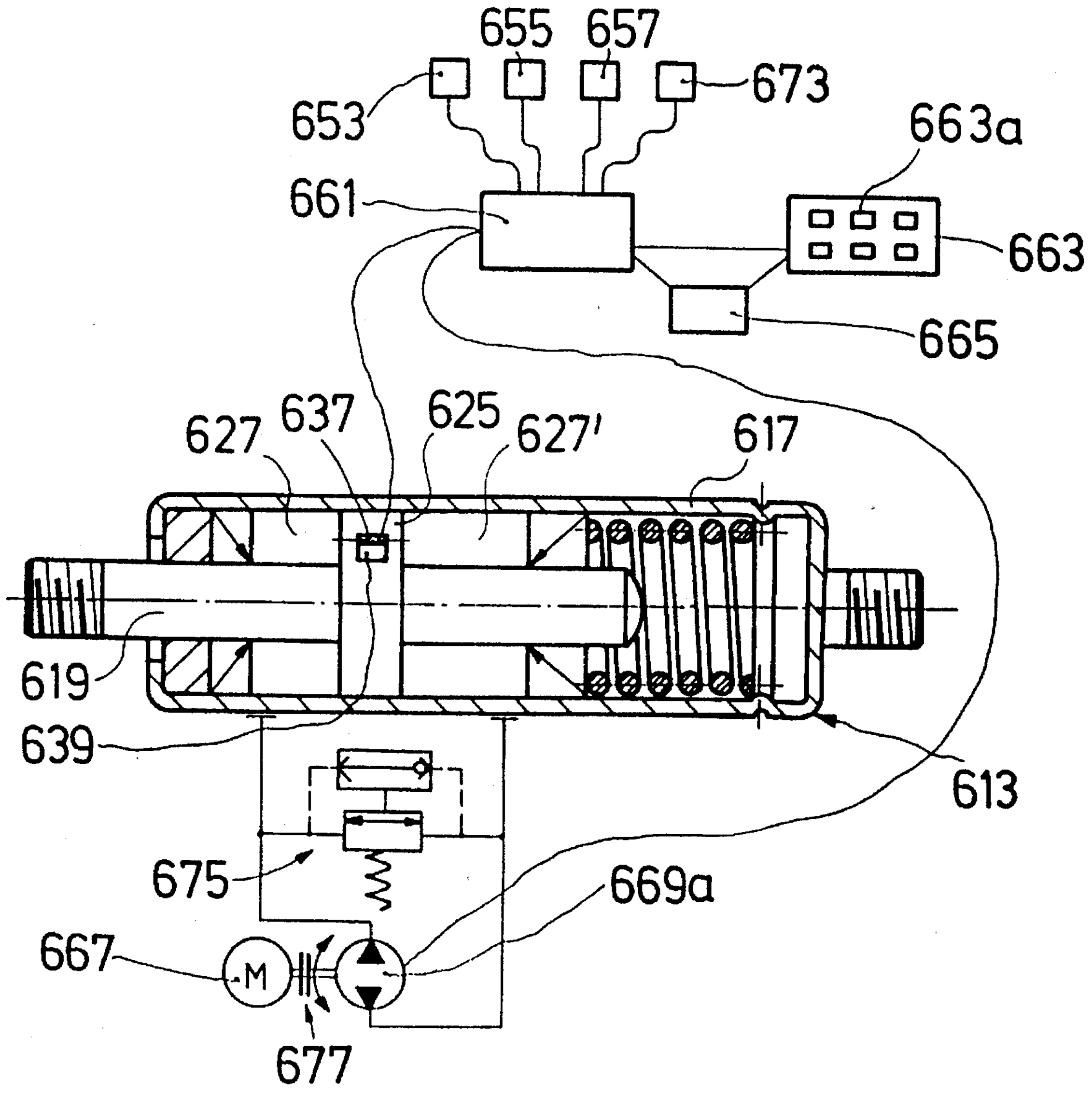
FIG. 6 shows an active positioning unit.
Figure 6A:
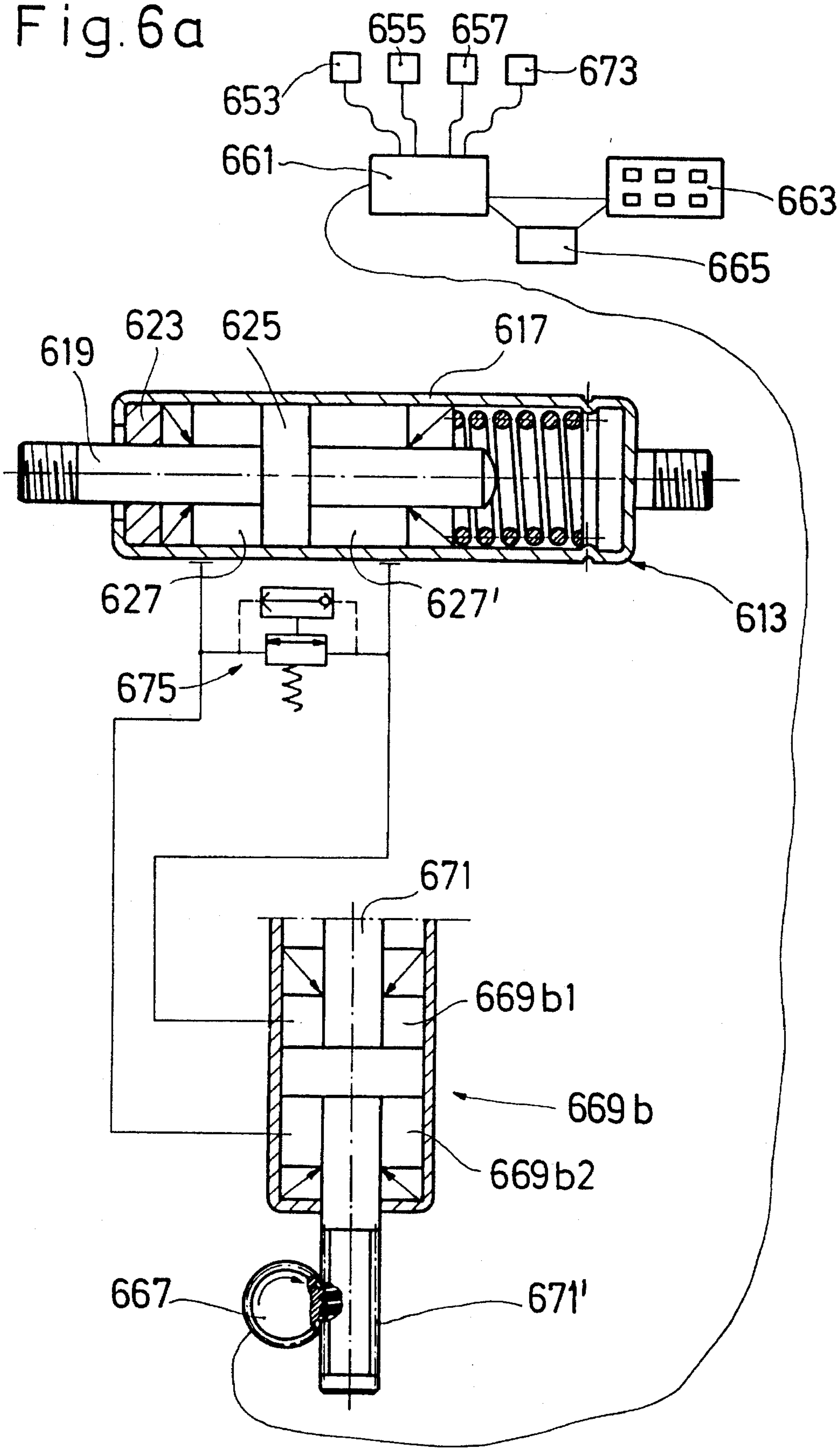
FIG. 6*a* shows a further embodiment of an active positioning unit.

In FIG. 6 there is shown a so-called active door positioning system. The piston unit 613 has a similar design as the piston unit shown in FIG. 2 and FIG. 5 and may be arranged in a cabin construction 1 as shown in FIG. 1. The working chambers 627,627' are interconnected by a fluid flow path containing a pump **669*a*** which may be a rotary pump and, more particularly, a positive displacement pump in which a plurality of cylinders are arranged parallel to a rotary axis distributed along a circle surrounding said rotary axis the pistons or plungers within said cylinders being driven by a driving disk rotating about said rotary axis and inclined with respect to a plane which is orthogonal to said rotary axis. In such a pump the pumped volume liquid per time unit can be easily varied by variation of the inclination of said disk.

It is easily understandable that by pumping the liquid in a first direction the piston rod 619 may be moved leftward with respect to the cylinder 617 and that by pumping the liquid in the second direction the piston rod may be moved rightward. Such, the door can be opened or closed in response to respective initiation signals. When moving the door the valve unit 637 will be closed so that the working chambers 627,627' are only connected with each other through the pump **669*a*. For positioning the door and arresting it in a predetermined position, one has several possibilities: One can stop the motor such that the rotary pump 669*a* is also stopped. Assuming that the internal flow resistance of the rotary pump is high the working chambers 627,627' will be separated from each other after stopping the motor 667**.

One can also open a clutch 677 between the motor 667 and the rotary pump **669*a* so that only the pump 669*a* comes to a standstill. Assuming again that the internal flow resistance of the rotary pump 669*a* is high, then the working chambers 627,627'** will be separated again from each other.

One can also adjust the inclination of the driving disk of the pump so that the conveyed liquid volume per time unit becomes Zero. In this case the internal flow resistance through the pump is normally as high as to provide complete separation of the two working chambers 627,627' from each other. One can see that the valve unit 637 is not absolutely necessary in this system.

The valve unit 637 may be helpful, however, as an additional component. For example, this valve unit may be used when the door is to be opened or closed by an operator from outside of the respective car. In this case the valve unit 637 may be switched from a usual handle on the outer side of the door. It is easily understandable that the sum of volumes of the working chambers 627,627' is also in this embodiment always equal irrespective of the position of the piston rod 619. So, it is not necessary to connect the pump **669*a*** with an additional reservoir of liquid.

The data processing unit 661 and the sensor units 653, 655, 657,673 may be used in an analoguous way as described in connection with FIG. 5. The same is true for the memory groups 663 and 665 and the keyboard **663*a***.

A security valve 675 is provided in bypass arrangement with respect to the pump **669*a*. When the pump or the motor or the electrical circuits fail the security valve 675 allows the movement of the door by human force. The security valve 675 may open in both directions in response to the direction of pressure difference between the working chambers 627, 627'. The sensor unit 673** is responsive to being touched by the operator. This sensor unit may be again an inductive or capacitive approach switch.

The approach switch 673 may be provided on the inner door cover 7 or on the door frame 11 as shown in FIG. 1.

One can again initiate the opening of the door by impetus and can control the continued movement of the door by acting onto the sensor 673 such as to prevent the door to enter into contact with obstacles.

The memory unit 663,665 may be programmed such that algorithms may be used for the control of the door movement and positioning. This may be explained as follows:

The opening of the door can be initiated by an impetus on the door body. This is not only true in the closed position but also in intermediate positions. In the closed position a relatively small impetus is sufficient for initiating the opening of the door. When the door is already partially opened and is to be opened further, a stronger impetus is necessary for said further opening such that an unintended contact of the door with an obstacle by an unintended impetus is prevented.

Moreover, the movement velocity of the door may be changed in accordance with the actual position of the door so that the door is retarded smoothly when approaching a desired opening position. Moreover, the velocity may be corrected in the final approach phase toward the closed position such that the energy of the door on the one hand is sufficient for automatically locking the door and on the other hand excessive shocks are avoided.

The emergency unit 675 may also be provided in parallel with the valve unit 637 inside the piston 625. In case of using the pump **669*a* for separating the working chamber 627,627' in case of a standstill a pressure sensitive bypass may also be provided within the pump 669*a*. When the type of rotary pump 669*a* allows to rotate the pump in response to pressure differences between the working chamber 627,627' and the positioning is obtained by arresting the motor one can also provide that the motor 667 can be entrained beyond a predetermined torque provided by the pump 669*a*. Further it is possible to provide between the pump 669*a* and the motor 667 a sliding clutch 677: In this case the sliding clutch 677 will allow rotation of the pump 669*a* in response to hand induced movement of the door when a predetermined torque is exceeded between the pump and the arrested motor 667**.

The embodiment of FIG. **6*a* differs from the embodiment of FIG. 6 only insofar that the rotary pump 669*a* has been replaced by a master cylinder 669*b* with working chambers 669*b*1,669*b*2. The master cylinder 669*b* is of the constant volume type as defined above. The working chambers 669*b*1,669*b*2 are connected for liquid flow with the working chambers 627,627' of the cylinder piston unit 613. All working chambers 627,627' and 669*b*1,669*b*2 and the conduit system there between are completely filled with liquid. The cylinder piston unit 613 behaves as a slave cylinder. The piston rod 671 of the master cylinder is provided with a rack or a screw 671'** which is in driving engagement with a gear driven by an electric motor.

Figure 7:
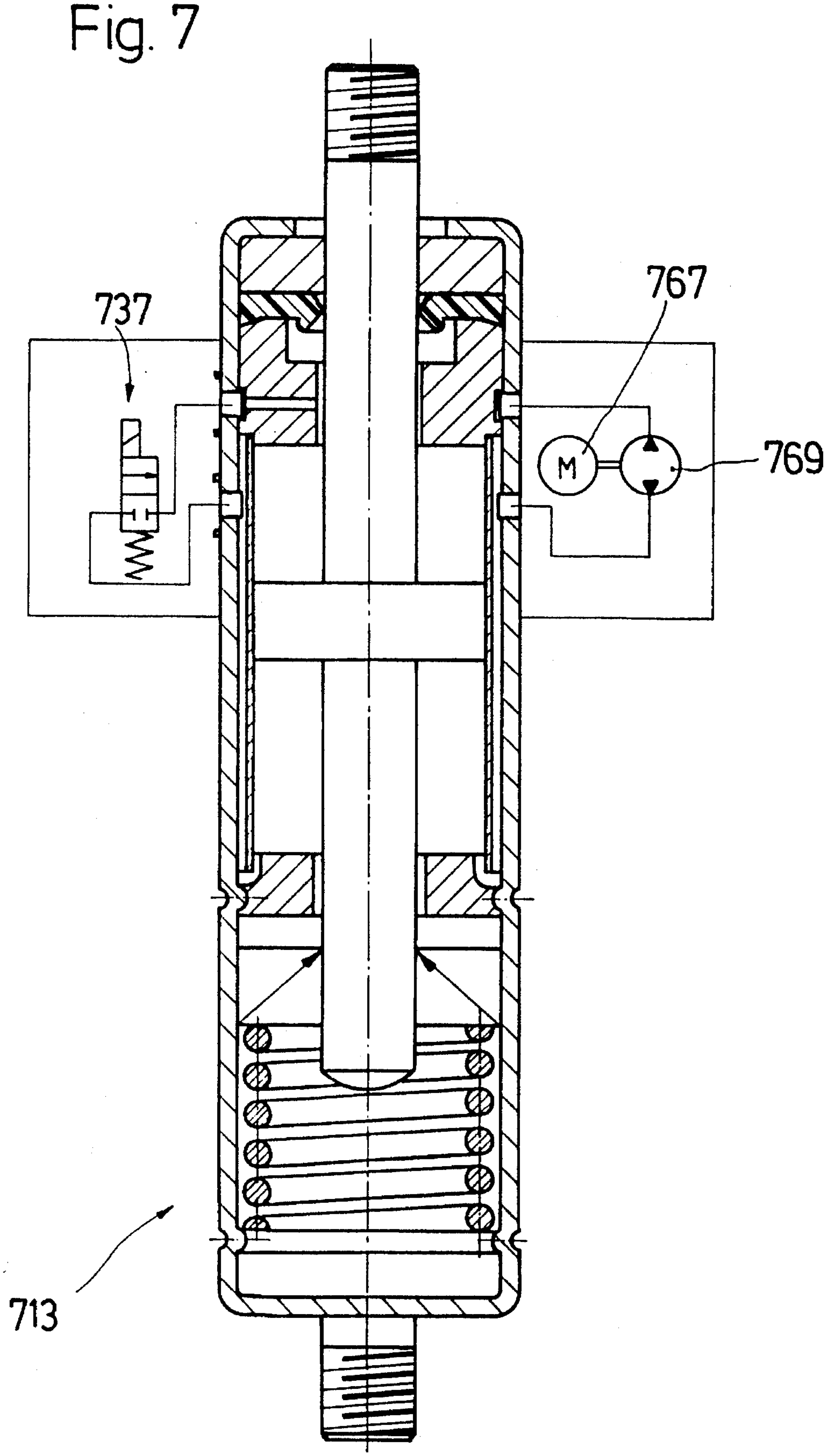
FIG. 7 shows a still further embodiment of an active positioning unit.

In FIG. 7 there is shown that a cylinder piston unit of the type as described with respect to FIG. 3 can also be used in an active door positioning system as shown in FIG. 6. Here both, the motor driven pump 769 and the valve unit 737 are integrated into the cylinder piston unit 713. This embodiment can be assembled with the motor vehicle as one single component. The fluid flow paths can be very short so that the volume of operation liquid can be reduced.

It is to be noted that the positioning units as described can also be used in connection with sliding doors.

It is to be noted that with both, the passive positioning unit and the active positioning unit, the flow resistance of the fluid flow path can be either adjusted continuously or switched between two or more values.

While specific embodiments of the invention have been shown and described in detail to illustrate the application of the inventive principles, it will be understood that the invention may be embodied otherwise without departing from such principles.

We claim:

1. A compartment confining construction comprising an opening and a closure unit having two main side faces and movably mounted on said compartment confining construction for movement between a closing position and a fully opened position with respect to said opening through intermediate positions, a fluid based positioning unit being connected to both said compartment confining construction and said closure unit, said fluid based positioning unit being provided with at least one flow path, a movement of said closure unit corresponding to a flow of fluid through said at least one flow path, fluid flow control means being provided for controlling said flow of fluid through said at least one flow path and thereby controlling the movement of said closure unit, said fluid flow control means being actuatable by electric actuating means, said fluid based positioning unit being a passive positioning unit, said flow of fluid occurring in response to movement of said closure unit when said closure unit is moved by an external force, said passive fluid based positioning unit comprising two working chambers interconnected by said at least one flow path, and said at least one flow path being provided with said flow control means.

2. A compartment confining construction as set forth in claim 1, said fluid flow control means being actuatable by an operator acting onto at least one surface district of said closure unit, said at least one surface district having a surface area corresponding to at least a substantial part of the total surface area of a respective side face.

3. A compartment confining construction as set forth in claim 1, said fluid flow control means being actuatable by an operator exerting an accelerating force on said closure unit.

4. A compartment confining construction as set forth in claim 1, said fluid based positioning unit being a liquid based positioning unit.

5. A compartment confining construction as set forth in claim 1, said fluid based positioning unit being a two-chamber positioning unit having two working chambers with respective variable volumes, the sum of said variable volumes being substantially constant during a positioning movement of said positioning unit.

6. A compartment confining construction as set forth in claim 1, said fluid based positioning unit being a cylinder piston unit.

7. A compartment confining construction as set forth in claim 6, said cylinder piston unit comprising a cylinder having an axis and defining a cavity therein along said axis, said cavity being confined by two end walls, a piston rod member extending through one of said end walls, a piston unit being connected to said piston rod member inside said cavity said piston unit separating said cavity into two working chambers, a piston rod extension being connected with said piston unit in substantially axial alignment with said piston rod member, said piston rod extension extending through the other one of said end walls, said piston rod extension having substantially the same cross-sectional area as said piston rod member, both said working chambers being connected to at least one flow path.

8. A compartment confining construction as set forth in claim 1, said at least one flow path being provided with a valve unit.

9. A compartment confining construction as set forth in claim 8, said valve unit being an electrically or electromagnetically actuatable valve unit.

10. A compartment confining construction as set forth in claim 1, said flow path having a flow path section subject to an electric or electromagnetic field, said fluid being a liquid having a viscosity variable in response to said electric or electromagnetic field.

11. A compartment confining construction as set forth in claim 10, said flow path section being combined with an arrangement of capacitor plates, said capacitor plates being connected to a voltage source.

12. A compartment confining construction as set forth in claim 1, said flow path interconnecting said two working chambers being provided inside a piston unit separating said two working chambers from each other.

13. A compartment confining construction as set forth in claim 1, said flow path interconnecting said two working chambers being provided on a cylinder member containing a piston unit, said piston unit separating said two working chambers from each other within said cylinder member, said flow path extending across said piston unit.

14. A compartment confining construction as set forth in claim 1, said fluid based positioning unit being provided with an emergency flow path.

15. A compartment confining construction as set forth in claim 1, said compartment confining construction being the car body of a motor vehicle, preferably of a passenger car.

16. A compartment confining construction as set forth in claim 15, said closure unit being a side door of a motor vehicle.

17. A compartment confining construction as set forth in claim 15, said closure unit being one of a trunk lid of a passenger car and a rear door of a station wagon.

18. A compartment confining construction as set forth in claim 2, said closure unit being a side door of a motor vehicle adjacent a driver's or passenger's seat, said at least one surface district being located within said respective side face such as to allow to the driver or passenger, respectively, to act upon said at least one surface district when being seated on said seat in a usual sitting position with a minimum of district search activity and a minimum of body movement.

19. A compartment confining construction as set forth in claim 1, said fluid flow control means being operatively connected to acceleration force sensor means.

20. A compartment confining construction as set forth in claim 19, said acceleration force sensor means being sensitive to an acceleration of said closure unit.

21. A compartment confining construction as set forth in claim 19, said acceleration force sensor means being sensitive to an acceleration in a direction of opening and closing movement of said closure unit.

22. A compartment confining construction as set forth in claim 19, said acceleration force sensor means being sensitive to the fluid pressure within said fluid based positioning unit, said fluid pressure being responsive to an acceleration force acting on said closure unit.

23. A compartment confining construction as set forth in claim 1, said compartment confining construction being a car body of a motor vehicle, said fluid flow control means being connected to said electric actuating means, said electric actuating means being further connected to data processing means and said data processing means being further connected to additional vehicle operation parameter sensing means.

24. A compartment confining construction as set forth in claim 23, said additional vehicle operation parameter sensing means comprising vehicle speed sensing means.

25. A compartment confining construction as set forth in claim 23, said data processing means being further connected to memory means.

26. A compartment confining construction as set forth in claim 25, said memory means comprising at least one of a memory unit for containing variable data to be fed in by the respective manufacturer and a user's memory group allowing the user to feed in user's specific data.

27. A compartment confining construction comprising an opening and a closure unit having two main side faces and movably mounted on said compartment confining construction for movement between a closing position and a fully opened position with respect to said opening through intermediate positions, a fluid based positioning unit being connected to both said compartment confining construction and said closure unit, said fluid based positioning unit being provided with at least one flow path, a movement of said closure unit corresponding to a flow of fluid through said at least one flow path, fluid flow control means being provided for controlling said flow of fluid through said at least one flow path thereby controlling the movement of said closure unit, said fluid flow control means being actuatable by electric actuating means, and said fluid flow control means being operatively connected to sensor means sensitive to an acceleration of said closure unit.

28. A compartment confining construction comprising an opening and a closure unit having two main side faces and movably mounted on said compartment confining construction for movement between a closing position and a fully opened position with respect to said opening through intermediate positions, a fluid based positioning unit being connected to both said compartment confining construction and said closure unit, said fluid based positioning unit being provided with at least one flow path, a movement of said closure unit corresponding to a flow of fluid through said at least one flow path, fluid flow control means being provided for controlling said flow of fluid through said at least one flow path and thereby controlling the movement of said closure unit, said fluid flow control means being actuatable by electric actuating means, said fluid flow control means being operatively connected to sensor means sensitive to the fluid pressure within said fluid based positioning unit, and said fluid pressure being responsive to a force acting on said closure unit.

* * * * *

UNITED STATES PATENT AND TRADEMARK OFFICE

CERTIFICATE OF CORRECTION

PATENT NO. : 5,468,042

DATED : November 21, 1995

INVENTOR(S) : Heinrich-Josef Heinrichs, Stephan Enders and Klaus Koch

It is certified that error appears in the above-identified patent and that said Letters Patent is hereby corrected as shown below:

Col. 6, line 18, "stand still" should read --standstill--;
Col. 7, line 32, "sould" should read --should--
Col. 8, line 67, "as shown" should read --is shown--;
Col. 9, line 61, "analoguous" should read --analogous--;
Col. 11, line 1, "sensor 557" should read --sensor which--;
Col. 11, line 49, "openend" should read --opened--;
Col. 14, line 15, "a an" should read --an--;
Col. 14, line 33, "intiate" should read --initiate--;
Col. 14, line 40, "preceeding" should read --preceding--;
Col. 15, line 64, "analoguous" should read --analogous--.

Signed and Sealed this

Second Day of July, 1996

Attest:

Bruce Lehman

BRUCE LEHMAN

Attesting Officer

*Commissioner of Patents and Trademarks*